(12) United States Patent  
Sugiura

(10) Patent No.: US 6,704,457 B1
(45) Date of Patent: Mar. 9, 2004

(54) SHADING CORRECTION APPARATUS AND AN IMAGE READ APPARATUS USING THE SHADING CORRECTION APPARATUS

(75) Inventor: Takashi Sugiura, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/385,709

(22) Filed: Aug. 30, 1999

(30) Foreign Application Priority Data

Aug. 31, 1998 (JP) .......................................... 10-245398

(51) Int. Cl.$^7$ ................................................ G06K 9/40
(52) U.S. Cl. ...................... 382/274; 358/406; 358/461; 358/497; 382/274
(58) Field of Search .......................... 382/274; 358/406, 358/461, 497, 448, 474, 483; 355/40

(56) References Cited

U.S. PATENT DOCUMENTS

| 4,691,240 A | | 9/1987 | Kurusu et al. .............. 358/282 |
|---|---|---|---|
| 5,099,341 A | | 3/1992 | Nosaki et al. .............. 358/461 |
| 5,214,518 A | * | 5/1993 | Kato .......................... 358/448 |
| 5,371,613 A | * | 12/1994 | Arimoto et al. ............ 358/461 |
| 5,982,948 A | | 11/1999 | Shimada et al. ........... 382/274 |
| 6,072,912 A | * | 6/2000 | Orito .......................... 382/274 |

FOREIGN PATENT DOCUMENTS

| GB | 23037578 | 2/1997 | .......... H04N/1/401 |
|---|---|---|---|
| JP | 9-149217 | 6/1997 | |

OTHER PUBLICATIONS

Patent Abstracts of Japan Pub. No. 10/023254; 23–01/98—See USP 5,982,948 attached.
English Abstract for JPA9–1492127.

* cited by examiner

*Primary Examiner*—Kimberly A. Williams
*Assistant Examiner*—Melanie M. Vida
(74) *Attorney, Agent, or Firm*—Morgan & Finnegan, L.L.P.

(57) ABSTRACT

A shading correction apparatus can execute a first method of adding and averaging, in the sub-scanning direction, shading data obtained by reading a white reference plate in the main scanning direction and in the sub-scanning direction to obtain correction data to be used for shading correction and a second method of directly using shading data obtained by reading the white reference plate in the main scanning direction as correction data for shading correction. When the white reference plate is pre-scanned by an image sensor, and the minimum value of the obtained shading data is equal to or smaller than a predetermined value, the first method is selected. When the minimum value exceeds the predetermined value, the second method is selected.

32 Claims, 12 Drawing Sheets

F I G. 6
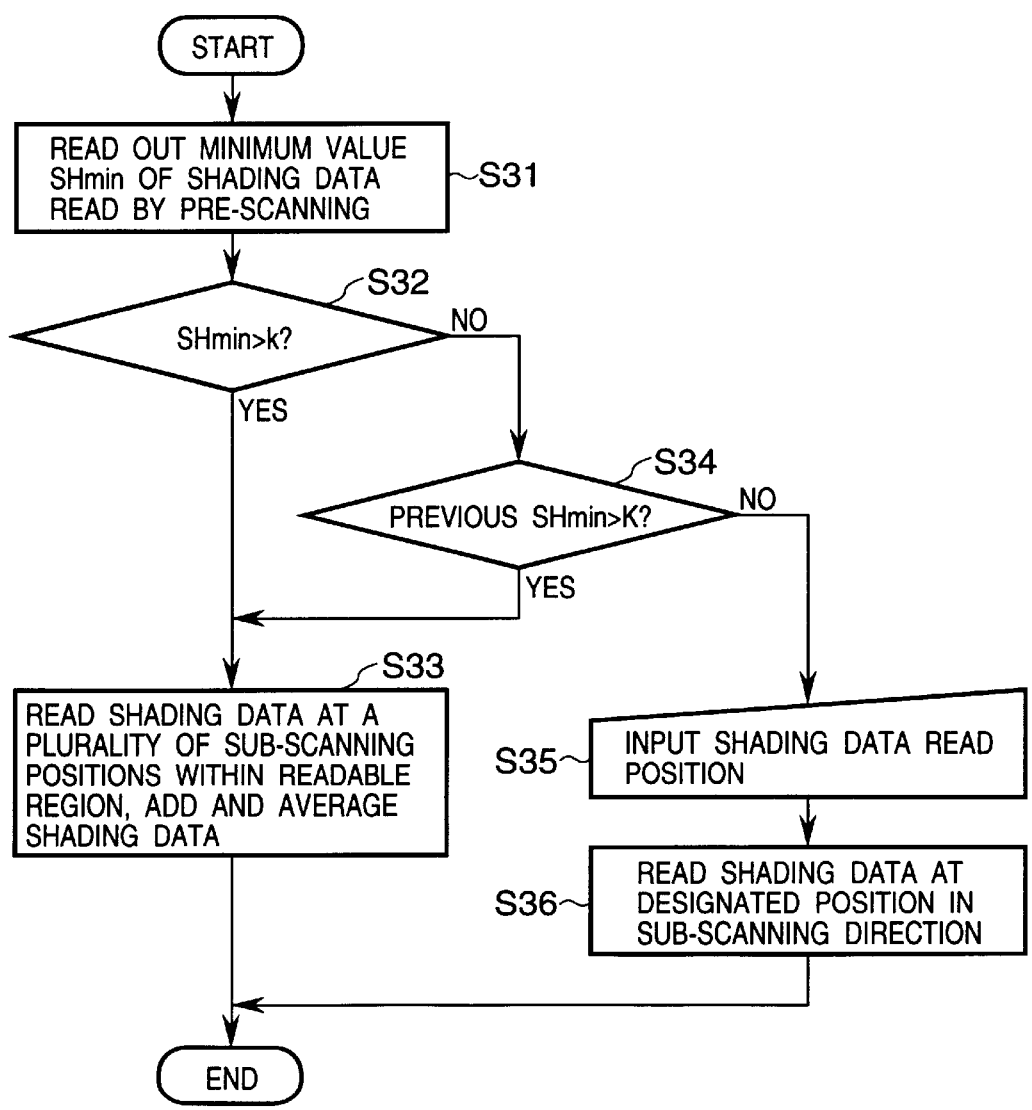

SHADING CORRECTION APPARATUS AND AN IMAGE READ APPARATUS USING THE SHADING CORRECTION APPARATUS

BACKGROUND OF THE INVENTION

The present invention relates to a shading correction apparatus for correcting shading of image data obtained by reading an image, using shading data obtained by reading a white reference plate, and an image read apparatus.

FIG. 8 is a view schematically showing the internal arrangement of an image read apparatus such as a copying machine using a CCD. In this image read apparatus, an original 1 placed on an original table 2 is irradiated with a lamp 3. The light reflected by the original is incident on a CCD sensor unit 8 through mirrors 4, 5, and 6 and a lens unit 7. The CCD sensor unit 8 reads the original image.

For the image data of the read original image, shading due to the characteristics of the mechanical and optical systems need be corrected. The shading is corrected using shading data obtained by reading a white reference plate 9 shown in FIG. 8 by the CCD sensor unit 8 having a plurality of pixels.

In the conventional shading correction by the above method, shading data is read by the CCD sensor unit 8 a plurality of number of times at the fixed position of the white reference plate 9. The average value of shading data is obtained in units of pixels of the CCD sensor unit 8. A shading correction coefficient (shading correction data) at each pixel position is calculated by comparing the average value with the target shading value (ideal value). In reading an image, image data obtained from a corresponding pixel of the CCD sensor unit 8 is multiplied by the shading correction coefficient, thereby correcting shading.

FIG. 9 is a graph for explaining the relationship between the average value of shading data obtained by reading the white reference plate 9 and the data value after shading correction. The broken line indicates the ideal value (level) of the shading value (data) when the white plate is read. The bold arrows indicate the average values of shading data at the respective pixel positions ($P_1$ to $P_9$). Since the shading correction coefficient at each pixel position=target value/average value, shading-corrected data (in this case, the target value) can be obtained, as indicated by each thin arrow in FIG. 9, by multiplying the average value of shading data by a corresponding shading correction coefficient. FIG. 10 shows an example of image data (bold arrows) obtained by reading the original and data (thin arrows) obtained by shading-correcting the image data using the obtained shading correction coefficients.

However, in the above-described conventional shading correction, the shading cannot be appropriately corrected when the light source largely degrades or obstacles such as large dust particles are present on the optical path. FIG. 11 is a graph showing the average value of shading data and shading-corrected data at each pixel position when an obstacle is present at a position corresponding to the pixel position $P_5$ on the white reference plate. As shown in FIG. 11, at the pixel position $P_5$, data supposed to be obtained has a signal level indicated by the circle of broken line. In fact, data having a signal level much lower than that indicated by the circle of broken line is obtained due to the obstacle. In this case, as is apparent from the thin arrow, a shading correction coefficient much larger than the necessary shading correction coefficient is calculated to correct the data at the pixel position $P_5$ to the target value.

FIG. 12 is a graph showing a case wherein image data (the same as in FIG. 10) read from the original is shading-corrected using a shading correction coefficient obtained on the basis of the shading data shown in FIG. 11. As shown in FIG. 12, when the image data at the pixel position $P_5$ is shading-corrected, the data is multiplied by the shading correction coefficient larger than the necessary shading correction coefficient. For this reason, the signal level becomes higher than the signal level (circle of broken line) supposed to be obtained.

To solve the above problem, a method has been proposed in which shading data is read at a plurality of positions shifted on the white reference plate in the sub-scanning direction, and the average value of shading data is obtained in units of pixels, thereby eliminating the influence of degradation in light source or obstacles on the optical path. FIG. 13 shows shading data read at a plurality of positions on the white reference plate and the average value of shading data at the respective pixel positions on the CCD sensor unit 8 when an obstacle is present at a position corresponding to the pixel position $P_5$ on the white reference plate at a certain read position. FIG. 14 is a graph showing a case wherein the image data (the same as in FIG. 10) read from the original is shading-corrected using a shading correction coefficient obtained on the basis of these average values.

As shown in FIGS. 13 and 14, when the shading data read at different positions on the white reference plate are averaged, the influence of an obstacle can be reduced, as compared to the case shown in FIGS. 11 and 12.

However, when a large obstacle is present on the white reference plate, appropriate shading correction cannot be performed by this method of averaging shading data read at a plurality of positions on the white reference plate.

FIG. 15 shows values obtained by averaging shading data read by the method described with reference to FIG. 13 when a large obstacle is present on the white reference plate. FIG. 16 is a graph showing image data obtained by shading correction using the average values.

SUMMARY OF THE INVENTION

The present invention has been made in consideration of the above situation, and has as its object of the present invention to provide a shading correction apparatus and method capable of minimizing the influence of a dust particle on a white reference plate and always performing optimum shading correction, and an image read apparatus using the shading correction apparatus.

According to the present invention, the foregoing object is attained by providing a shading correction apparatus for performing shading correction of data obtained by reading an original using shading data obtained by reading a white reference plate by an image sensor, the apparatus characterized by comprising: first correction data acquisition means for obtaining correction data to be used for shading correction using the shading data obtained by reading the white reference plate in a first direction and a second direction perpendicular to the first direction; second correction data acquisition means for obtaining correction data to be used for shading correction using the shading data obtained by reading the white reference plate in the first direction; and selection means for selecting one of the first correction data acquisition means and the second correction data acquisition means.

According to the present invention, the foregoing object is also attained by providing an image read apparatus for performing shading correction of data obtained by reading an original using shading data obtained by reading a white reference plate by an image sensor, the apparatus characterized by comprising: first correction data acquisition means for obtaining correction data to be used for shading correction using the shading data obtained by reading the white reference plate in a first direction and a second direction perpendicular to the first direction; second correction data acquisition means for obtaining correction data to be used for shading correction using the shading data obtained by reading the white reference plate in the first direction; and selection means for selecting one of said first correction data acquisition means and the second correction data acquisition means.

Further, the foregoing object is also attained by providing a shading correction method of performing shading correction of data obtained by reading an original using shading data obtained by reading a white reference plate by an image sensor, the method characterized by comprising: the first correction data acquisition step of obtaining correction data to be used for shading correction using the shading data obtained by reading the white reference plate in a first direction and a second direction perpendicular to the first direction; the second correction data acquisition step of obtaining correction data to be used for shading correction using the shading data obtained by reading the white reference plate in the first direction; and the selection step of selecting one of the first correction data acquisition step and the second correction data acquisition step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flow chart showing a control operation of the shading correction apparatus according to the third embodiment of the present invention;

DETAILED DESCRIPTION OF THE PREFERRED EMBODIMENTS

Preferred embodiments of the present invention will be described in detail in accordance with the accompanying drawings.

First Embodiment

Figure 1:
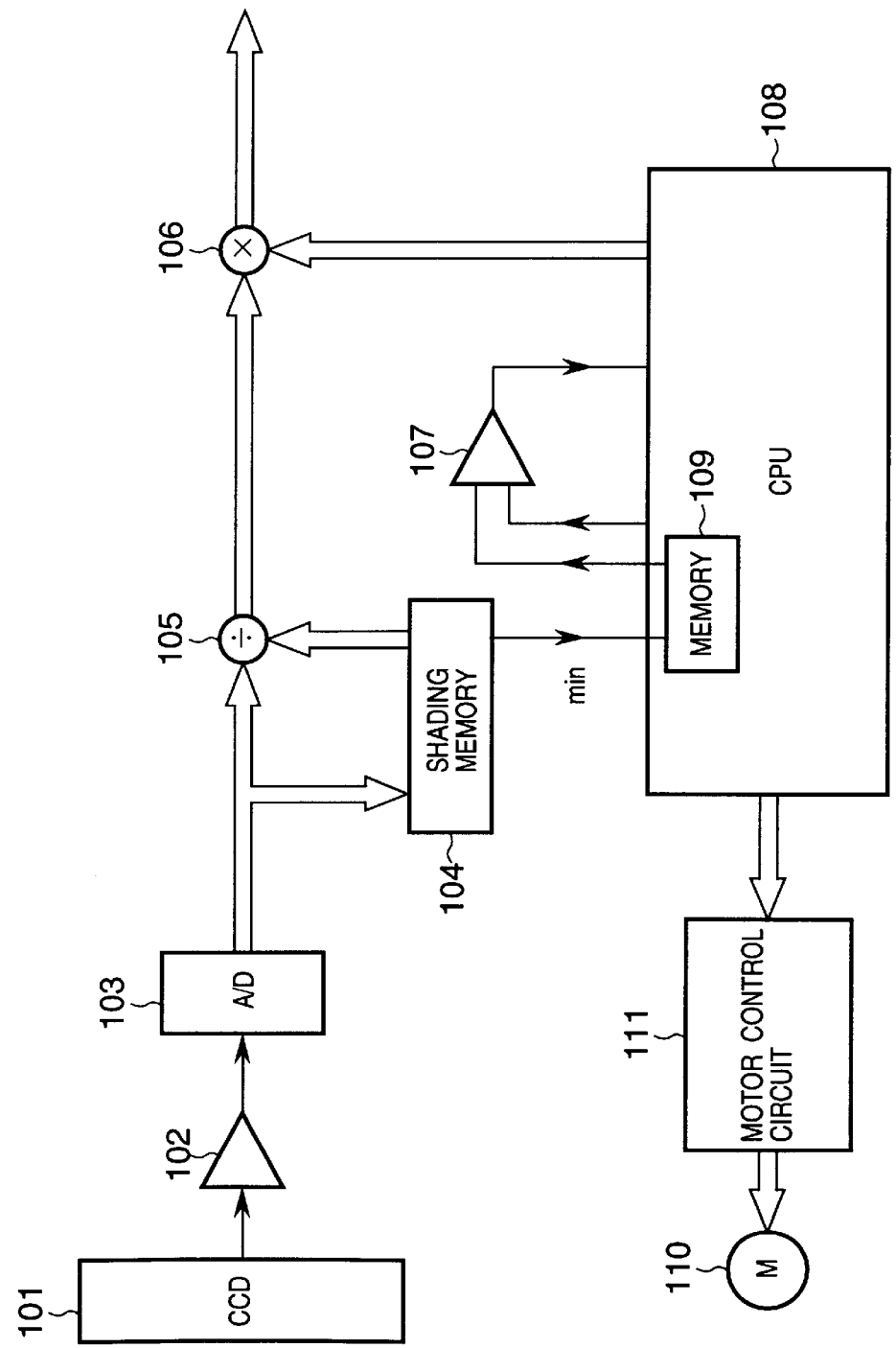
FIG. 1 is a block diagram showing an arrangement of a shading correction apparatus according to the first embodiment of the present invention.

FIG. 1 is a block diagram showing an arrangement of a shading correction apparatus according to the first embodiment of the present invention.

Referring to FIG. 1, reference numeral 101 denotes a CCD linear image sensor. An amplification circuit (AMP) 102 amplifies the output from the image sensor 101. An analog/digital converter (A/D) 103 converts the amplified analog signal into a digital signal. Shading memory 104 stores image data (shading data) obtained by reading a white reference plate (not shown) as a digital signal. A division circuit 105 divides the image data converted into a digital signal by shading data stored in the memory 104. A multiplication circuit 106 multiplies the divided data by a predetermined value and outputs shading-corrected image data.

A comparison circuit 107 compares the minimum value (min) of the data stored in the memory 104 with a predetermined value. A CPU 108 performs various control operations and has memory 109 for storing minimum value data from the memory 104. A motor 110 moves the read position in the sub-scanning direction. A motor control circuit 111 controls driving the motor 110.

In the above arrangement, image data read from an original is shading-corrected using shading data obtained by reading the white reference plate (not shown). In the shading correction apparatus according to the first embodiment, the CPU 108 has a shading data acquisition section for scanning the white reference plate with the image sensor 101 in the main scanning direction and sub-scanning direction to obtain shading data, and a shading data acquisition section for scanning the white reference plate in only the main scanning direction to obtain shading data. The CPU 108 also has a selection section for selecting one of the two shading data acquisition sections.

The operation of the shading correction apparatus according to the first embodiment will be described next.

In the white reference plate read mode, digital data obtained by A/D-converting the output from the image sensor 101 is stored in the memory 104. The minimum value in the memory 104 is stored in the memory 109 of the CPU 108. In the normal original read mode, the A/D-converted output is directly input to the division circuit 105 without being stored in the memory 104, and divided by the shading data stored in the memory 104. After this, the multiplication circuit 106 multiplies the data by a predetermined value. The CPU 108 sets the predetermined value as an ideal value obtained when the white reference plate is read. The image data obtained by reading the original is shading-corrected by the division and multiplication.

In the first embodiment, before shading data to be used for shading correction is read, the white reference plate is read once by pre-scanning in the main scanning direction. The minimum value of the shading data obtained at that time is stored in the memory 109 of the CPU 108. When the minimum value of shading data read by pre-scanning, which is stored in the memory 109, is larger than a predetermined value, shading data are read at different sub-scanning positions in the main scanning direction within the readable region (control region) on the white reference plate. Shading correction is performed using the value obtained by adding and averaging the read shading data in the sub-scanning direction. If the minimum value of shading data read by pre-scanning is equal to or smaller than the predetermined value, shading data is read at another sub-scanning position within the readable region on the white reference plate, and shading correction is performed using the read value. The two operations are automatically switched. When the minimum value is equal to or smaller than the predetermined value, the user is caused to input a sub-scanning shading data read position. Pre-scanning can be performed at any position within the readable region on the white reference plate, and in the first embodiment, the shading data is read at a position near the center of the white reference plate in the main scanning direction in the pre-scanning.

Shading correction for the former case is represented by equation (1).

$$Dout(I)=\{\Sigma Din(I)\times SH\_TAR\}/\{SHdata(I)\times n\} \qquad (1)$$

where Dout(I): data of the I-th pixel after shading correction
Din(I): data of the I-th pixel before shading correction
SH_TAR: ideal read value of white reference plate
SHdata(I): white reference plate read value of I-th pixel;
n: read count in sub-scanning direction
Shading correction for the latter case is represented by equation (2).

$$Dout(I)=\{Din(I)\times SH\_TAR\}/\{SHdata(I)\} \qquad (2)$$

Figure 2:
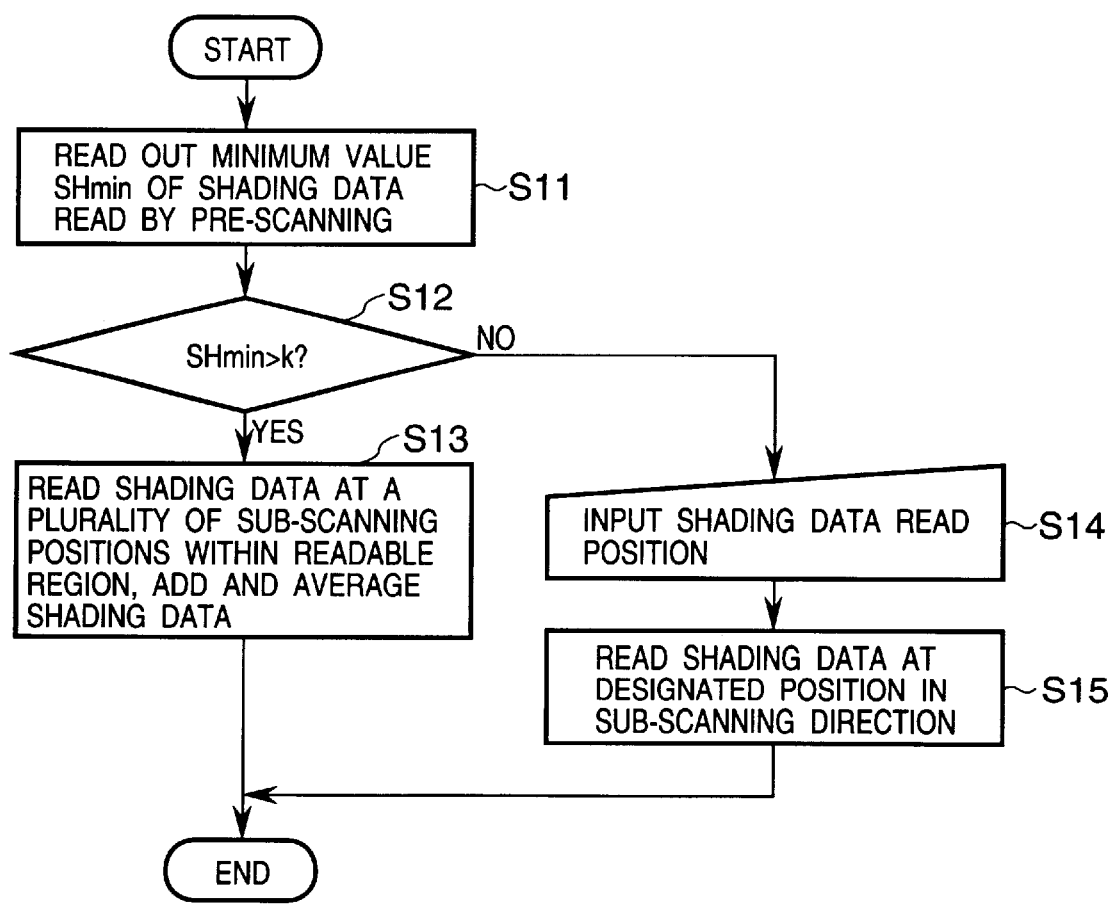
FIG. 2 is a flow chart showing a control operation of the shading correction apparatus according to the first embodiment of the present invention.

FIG. 2 is a flow chart showing the control operation of the shading correction apparatus according to the first embodiment of the present invention. Specifically, FIG. 2 shows shading data acquisition control. This control operation is performed by the CPU 108 in accordance with a control program stored in advance.

In step S11, a minimum value SHmin of shading data read by pre-scanning is read out from the memory 109. In step S12, it is determined whether the readout minimum value SHmin is larger than a predetermined value k. If YES in step S12, the flow advances to step S13. The motor control circuit 111 controls the motor 110 to move the read position in the sub-scanning direction within the readable region of the white reference plate, so shading data are read at a plurality of positions. The read shading data are added and averaged.

If NO in step S12, the flow advances to step S14. After the user designates a shading data read position, the white reference plate is read at the designated position by controlling the motor 110 on the basis of the designation, thereby obtaining shading data (step S15).

The method of reading the readable region on the white reference plate and performing shading correction upon adding and averaging the shading data is very effective for a small dust particle on the white reference plate. In the presence of a small dust particle, the decrease in average value can minimized by using the average value of shading data. Note that "small" means that the number of data influenced by the dust particle is very small with respect to the number of shading data read during movement in the sub-scanning direction.

However, when the dust particle is large, i.e., when the number of data influenced by the dust particle is large with respect to the number of shading data read during movement in the sub-scanning direction, the average value of shading data becomes much smaller than that obtained in the absence of the dust particle. In this state, a more satisfactory shading correction effect can be obtained by using, for shading correction, not the average value but shading data obtained at a position on the white reference plate without any dust particle.

As described above, according to the first embodiment, one of two different methods, i.e., the method of reading shading data at a plurality of positions in the sub-scanning direction and using the average value of shading data for shading correction and the method of reading shading data at a designated position and directly using the read value for shading correction is automatically selected. Hence, the influence of dust particles on the white reference plate can be reduced.

In the first embodiment, shading data is directly stored in the memory 104. However, the same effect as described above can be obtained even when a shading correction coefficient is stored in the memory 104 and compared with a predetermined value, and the data acquisition method used for shading correction is switched in accordance with the comparison result.

Second Embodiment

The second embodiment will be described next.

Figure 3:
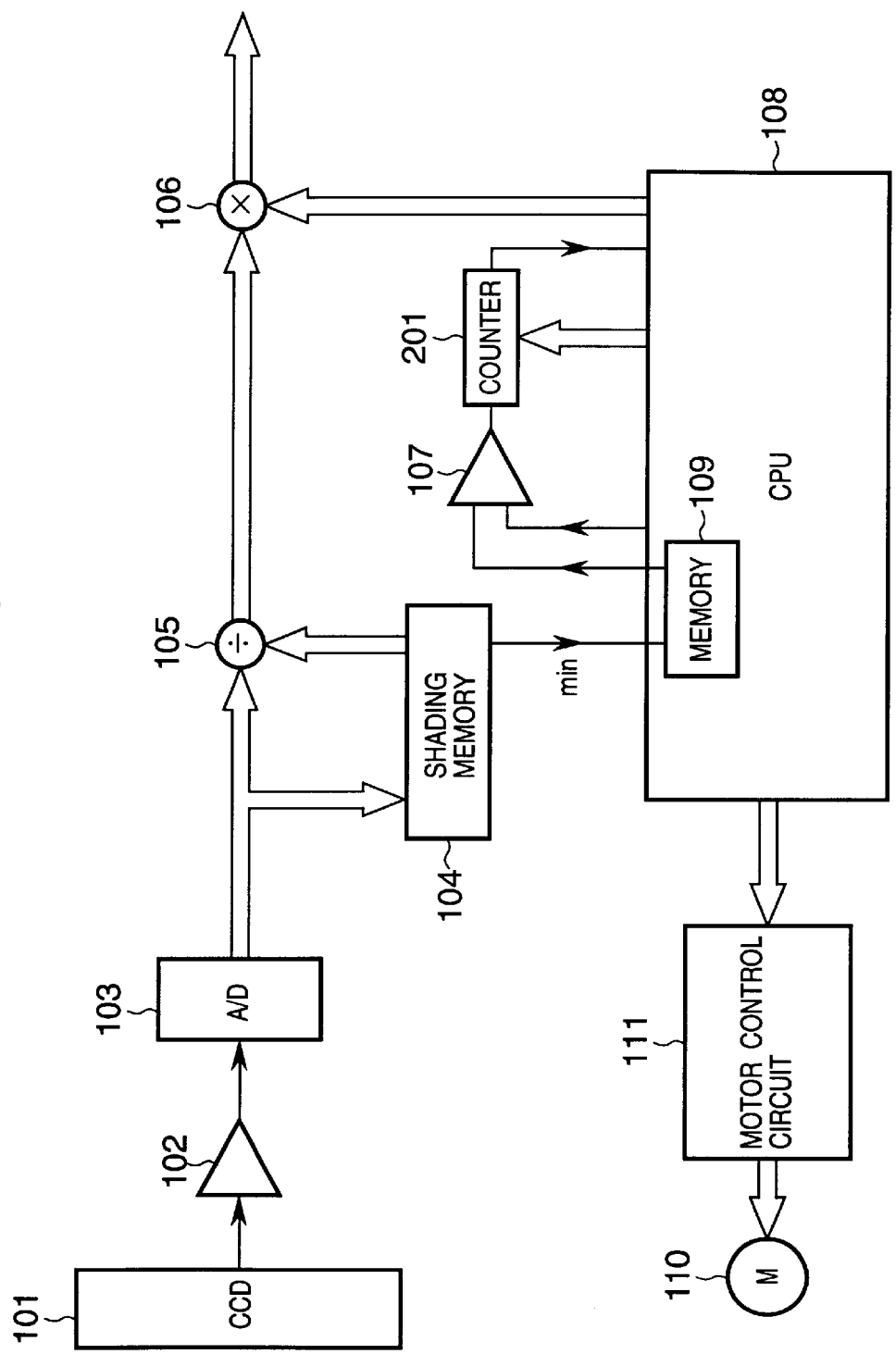
FIG. 3 is a block diagram showing an arrangement of a shading correction apparatus according to the second embodiment of the present invention.

FIG. 3 is a block diagram showing an arrangement of a shading correction apparatus according to the second embodiment of the present invention. The same reference numerals as in FIG. 1 denote the same part in FIG. 3. Referring to FIG. 3, a counter 201 counts comparison result output from a comparison circuit 107.

In this arrangement, when a white reference plate (not shown) is to be read, as in the first embodiment, digital data obtained by A/D-converting the output from an image sensor 101 is stored in memory 104. The minimum value in the memory 104 is also stored in memory 109 of a CPU 108. In the normal original read mode, the A/D-converted output is directly input to a division circuit 105 without being stored in the memory 104, and divided by the shading data stored in the memory 104. After this, a multiplication circuit 106 multiplies the data by a predetermined value. The CPU 108 sets the predetermined value as an ideal value obtained when the white reference plate is read. The image data obtained by reading the original is shading-corrected by the division and multiplication.

In the second embodiment as well, pre-scanning is performed before shading data to be used for shading correction is read. In the second embodiment, the white reference plate is read at a plurality of sub-scanning positions (e.g., 5 to 10 positions) in the main scanning direction, and the minimum value of the shading data obtained at that time is stored in the memory 109 of the CPU 108 every time the shading data is read in the main scanning direction. The counter 201 counts the number of shading data having minimum values equal to or smaller than a predetermined value, which are read by pre-scanning and stored in the memory 109. When the count value is equal to or smaller than a predetermined value, shading data is read at sub-scanning positions in the main scanning direction within the same region on the white reference plate as the pre-scanning. Shading correction is performed using a value obtained by adding and averaging the read shading data in the sub-scanning direction. If the count value exceeds the predetermined value, shading data is read at another position within the readable region on the white reference plate. Shading correction is performed using this read value. The two operations are automatically switched. When the count value exceeds the predetermined value, the user is caused to input a sub-scanning shading data read position. Pre-scanning can be performed at any position within the readable region on the white reference plate, and in the second embodiment, the shading data is read at a position near the center of the white reference plate in the main scanning direction in the pre-scanning.

Figure 4:
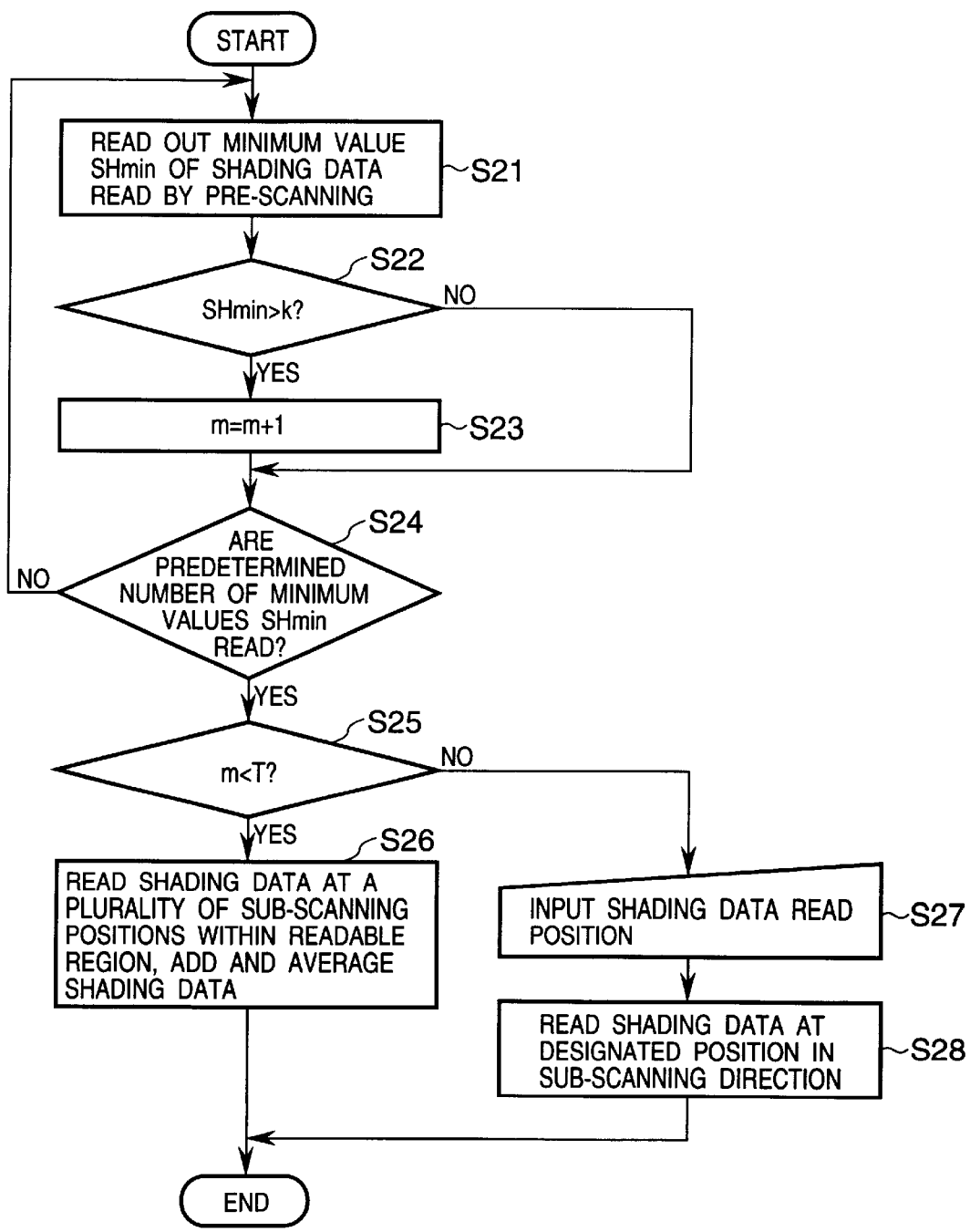
FIG. 4 is a flow chart showing a control operation of the shading correction apparatus according to the second embodiment of the present invention.

FIG. 4 is a flow chart showing the control operation of the shading correction apparatus according to the second embodiment of the present invention. Especially, FIG. 4 shows shading data acquisition control. This control operation is performed by the CPU 108 in accordance with a control program stored in advance.

In step S21, a minimum value $SH_{min}$ of shading data read by pre-scanning is read out from the memory 109. In step S22, it is determined whether the readout minimum value $SH_{min}$ is larger than a predetermined value k. If YES in step S22, the flow advances to step S23 to increment a counter value m by one. Then, the flow advances to step S24. If NO in step S22, the flow directly advances to step S24 without incrementing the counter value. In step S24, it is determined whether a predetermined number (the number of sub-scanning positions where shading data is read by pre-scanning) of minimum values $SH_{min}$ are read. If NO in step S24, the flow returns to step S21 to repeat processing in steps S21 to S24.

If YES in step S24, the flow advances to step S25 to determine whether the counter value m is smaller than a predetermined value T. If YES in step S25, the flow advances to step S26. The motor control circuit 111 controls the motor 110 to move the read position in the sub-scanning direction within the readable region of the white reference plate, so shading data are read at a plurality of positions. The read shading data are added and averaged.

If NO in step S25, the flow advances to step S27. After the user designates a shading data read position, the white reference plate is read at the designated position by controlling the motor 110 on the basis of the designation, thereby obtaining shading data (step S28).

The second embodiment provides the following effect in addition to the effect of the first embodiment. When a plurality of fine dust particles are present on the white reference plate, and the number of shading data influenced by the dust particles beyond a predetermined level is equal to or smaller than a predetermined value, the average value of the shading data is used to correct shading. If the number of shading data influenced by the dust particles beyond a predetermined level is larger than the predetermined value, shading data read at a position selected by the user, which has no influence of the dust particles, is directly used for shading correction. For this reason, the accuracy of shading can be controlled.

Third Embodiment

The third embodiment will be described next.

Figure 5:
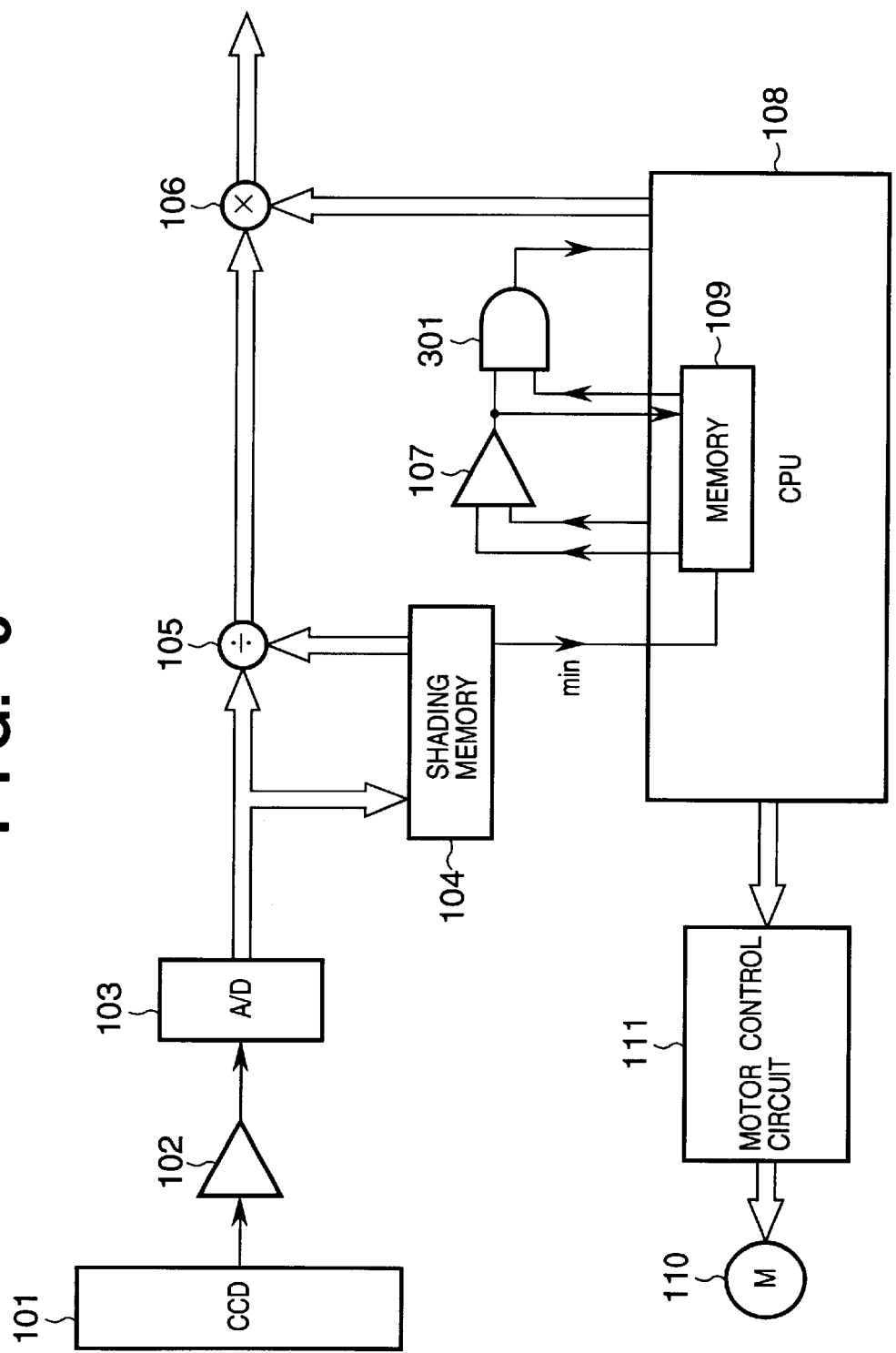
FIG. 5 is a block diagram showing an arrangement of a shading correction apparatus according to the third embodiment of the present invention.

FIG. 5 is a block diagram showing the arrangement of a shading correction apparatus according to the third embodiment of the present invention. The same reference numerals as in FIGS. 1 and 3 denote the same parts in FIG. 5. Referring to FIG. 5, an AND circuit 301 calculates the AND condition between the output of a comparison result from a comparison circuit 107 and the previous comparison result stored in memory 109 of a CPU 108.

Operations in the white reference plate read mode and in the normal original read mode are the same as in the first and second embodiments, and a detailed description thereof will be omitted.

In the third embodiment as well, pre-scanning is performed before shading data to be used for shading correction is read. In the third embodiment, the white reference plate is read at a plurality of sub-scanning positions in the main scanning direction, and the minimum value of the shading data obtained at that time is stored in the memory 109 of the CPU 108 every time the shading data is read in the main scanning direction. The result of comparison between a minimum value stored in the memory 109 and a predetermined value are input to the AND circuit 301. When the values of two consecutive read shading data are equal to or smaller than the predetermined value, shading data is read by scanning at another predetermined position within the readable region on the white reference plate, and the read value is used for shading correction. Otherwise, shading data are read at sub-scanning positions in the main scanning direction within the same region on the white reference plate as the pre-scanning, and a value obtained by adding and averaging the read shading data is used to correct shading. Pre-scanning can be performed at any position within the readable region on the white reference plate, and in the third embodiment, the shading data is read at a position near the center of the white reference plate in the main scanning direction in the pre-scanning.

In the above example, the operation is switched for two consecutive shading data. However, the present invention is not limited to this, and n comparison results from the comparison circuit 107 may be stored. When n consecutive shading data are equal to or smaller than the predetermined value, shading data is read at another position within the readable region on the white reference plate, and the read value is used for shading correction. The two operations are automatically switched. When the count value exceeds the predetermined value, the user is caused to input a sub-scanning shading data read position.

FIG. 6 is a flow chart showing the control operation of the shading correction apparatus according to the third embodiment of the present invention. FIG. 6 shows shading data acquisition control. This control operation is performed by the CPU 108 in accordance with a control program stored in advance.

In step S31, a minimum value SHmin of shading data read by pre-scanning is read out from the memory 109. In step S32, it is determined whether the readout minimum value SHmin is larger than a predetermined value k. If YES in step S32, the flow advances to step S33.

If NO in step S32, the flow advances to step S34 to read out, from the memory 109, the comparison result between the minimum value SHmin of the previously read shading data and the predetermined value k. If the minimum value SHmin is larger than the predetermined value k, the flow advances to step S33. In step S33, a motor control circuit 111 controls a motor 110 to move the read position in the sub-scanning direction within the readable region of the white reference plate, so shading data is read at a plurality of positions. The read shading data are added and averaged.

If it is determined in step S34 that the comparison result between the minimum value SHmin of the previous shading data and the predetermined value k indicates that the predetermined value k is equal to or smaller than the minimum value SHmin, the flow advances to step S35. After the user designates a shading data read position, the white reference plate is read at the designated position by controlling the motor 110 on the basis of the designation, thereby obtaining shading data (step S36).

The third embodiment provides the following effect in addition to the effect of the first embodiment. When a predetermined number or more of consecutive shading data are influenced by a dust particle beyond a predetermined level, the method of acquiring data for shading correction can be changed to adjust the accuracy of shading.

Fourth Embodiment

The fourth embodiment will be described next.

In the fourth embodiment, a shading correction apparatus having the arrangement described in the first embodiment with reference to FIG. 1 is used.

The fourth embodiment is different from the first embodiment in the following point. When the minimum value of shading data read by pre-scanning is equal to or smaller than a predetermined value, shading data are read at a plurality of positions while scanning a predetermined region in the sub-scanning direction. The minimum values of shading data obtained at the respective positions are stored in memory 104 and compared with each other. Shading data having the largest minimum value are determined as data to be used for shading correction. The remaining operations are the same as those described in the first embodiment with reference to FIG. 2.

Figure 7:
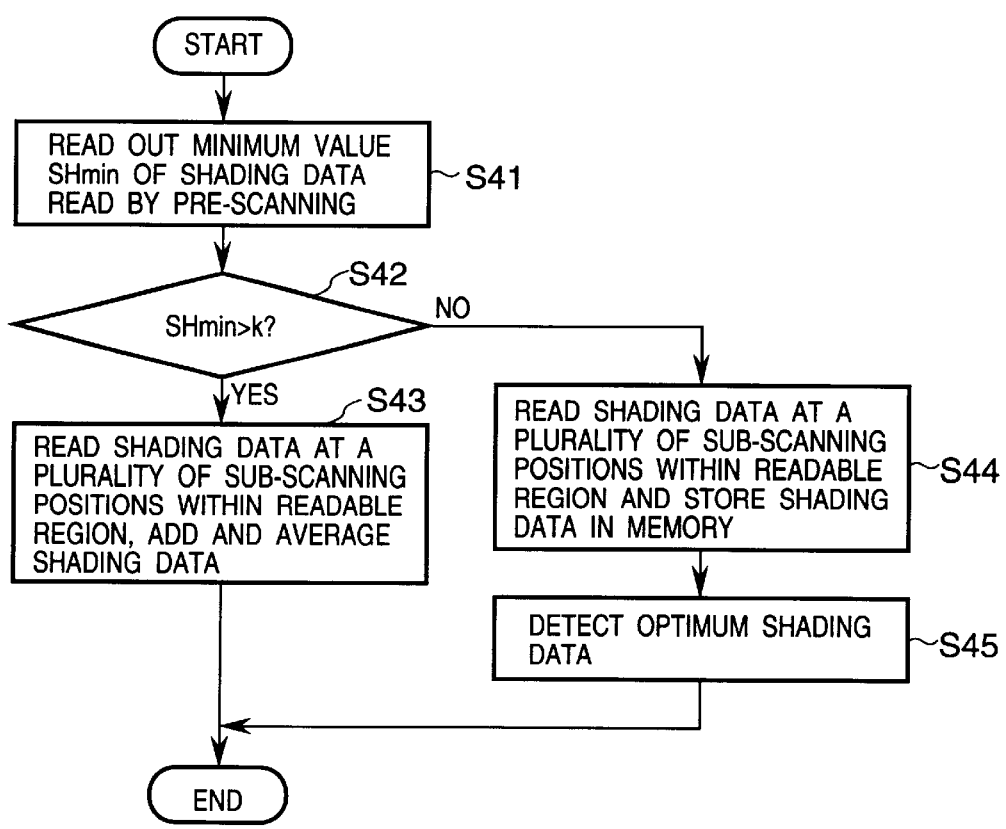
FIG. 7 is a flow chart showing a control operation of the shading correction apparatus according to the fourth embodiment of the present invention.

FIG. 7 is a flow chart showing the control operation of the shading correction apparatus according to the fourth embodiment. Especially, FIG. 7 shows shading data acquisition control. This control operation is performed by a CPU 108 in accordance with a control program stored in advance.

As in the first and third embodiments, in step S41, a minimum value SHmin of previously read shading data is read out from a memory 109. In step S42, it is determined whether the readout minimum value SHmin is larger than a predetermined value k. If YES in step S42, the flow advances to step S43. A motor control circuit 111 controls a motor 110 to move the read position in the sub-scanning direction within the readable region of the white reference plate, so shading data are read at a plurality of positions. The read shading data are added and averaged.

If NO in step S42, the flow advances to step S44. The motor control circuit 111 controls the motor 110 to move the read position in the sub-scanning direction within the readable region of the white reference plate, so shading data are read at a plurality of positions and stored in the memory 104. The minimum values SHmin at the respective positions are stored in the memory 109. In step S45, optimum shading data is selected from the read shading data. More specifically, the largest minimum value is selected from the minimum values SHmin stored in the memory 109, and shading data having the selected minimum value SHmin is determined as data to be used for shading correction.

The fourth embodiment provides the following effect in addition to the effect of the first embodiment. When a dust particle is present on the white reference plate, data with the minimum influence of the dust particle is selected from a plurality of shading data and used for shading correction. For this reason, the accuracy of shading correction can be increased.

The operation of the fourth embodiment can be applied to the second and third embodiments. More specifically, the operation in steps S44 and S45 in FIG. 7 can be performed in place of steps S27 and S28 in FIG. 4 or steps S35 and S36 in FIG. 6.

In the first to fourth embodiments, the shading correction apparatus has been described. However, the shading correction apparatus of the present invention can be used for an apparatus such as a copying machine or a scanner which reads and processes an image.

In the first to fourth embodiments, a signal is read using the CCD linear image sensor 101. However, the present invention is not limited to this. An area sensor may be used instead of the linear image sensor. This can make the processing speed higher than that in use of the linear image sensor.

Figure 8:
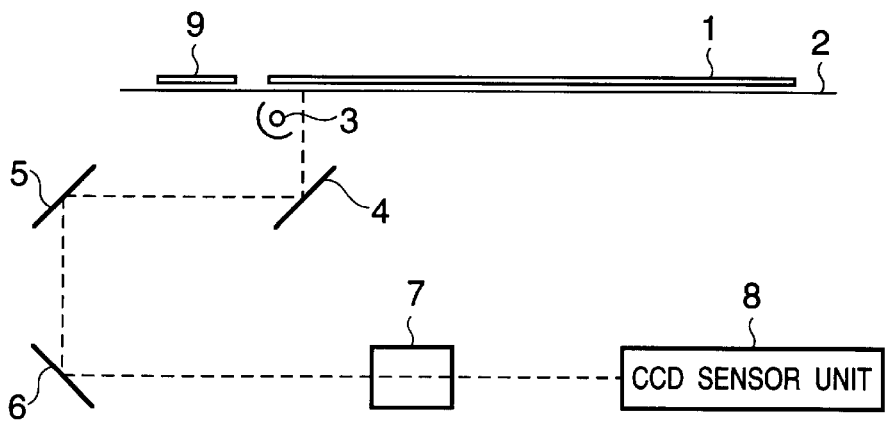
FIG. 8 is a view schematically showing an internal arrangement of a conventional image read apparatus.
Figure 9:
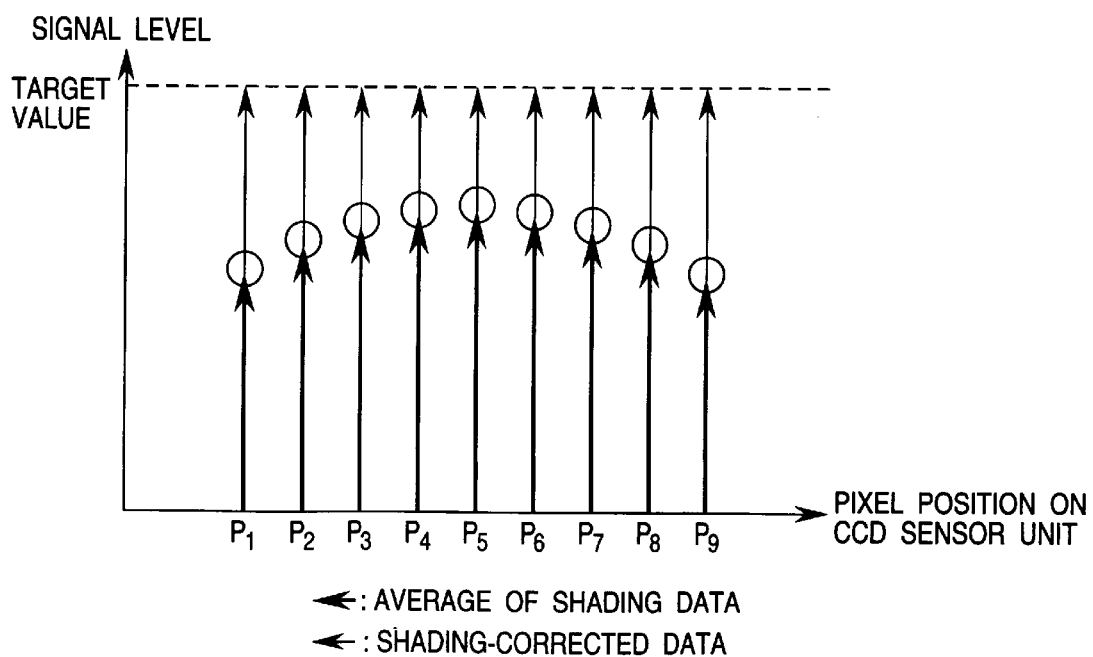
FIG. 9 is a graph for explaining the relationship between the average value of shading data obtained by reading a white reference plate and the shading-corrected data value.
Figure 10:
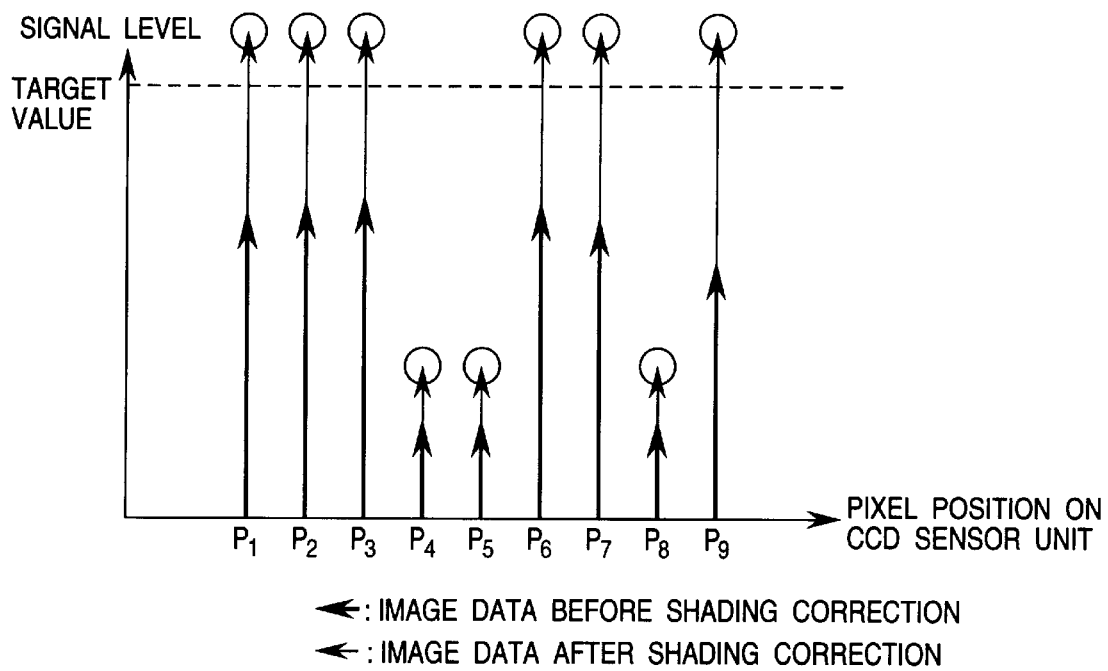
FIG. 10 is a graph for explaining the relationship between the image data obtained by reading an original and the shading-corrected image data.
Figure 11:
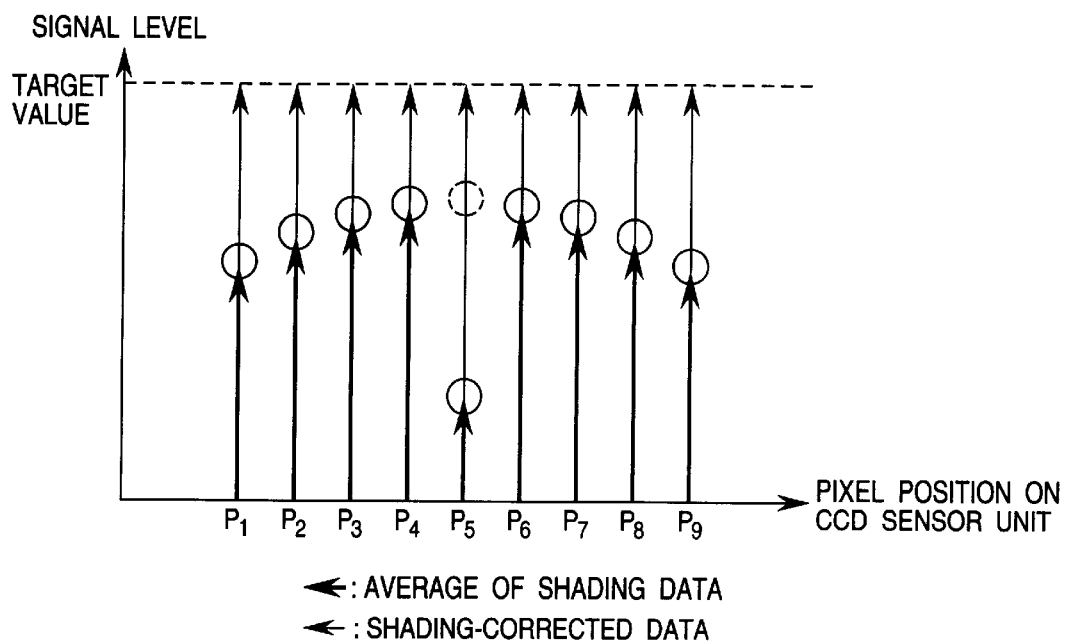
FIG. 11 is a graph for explaining the relationship between the average value of shading data obtained by reading the white reference plate and the shading-corrected data when an obstacle is present on the white reference plate.
Figure 12:
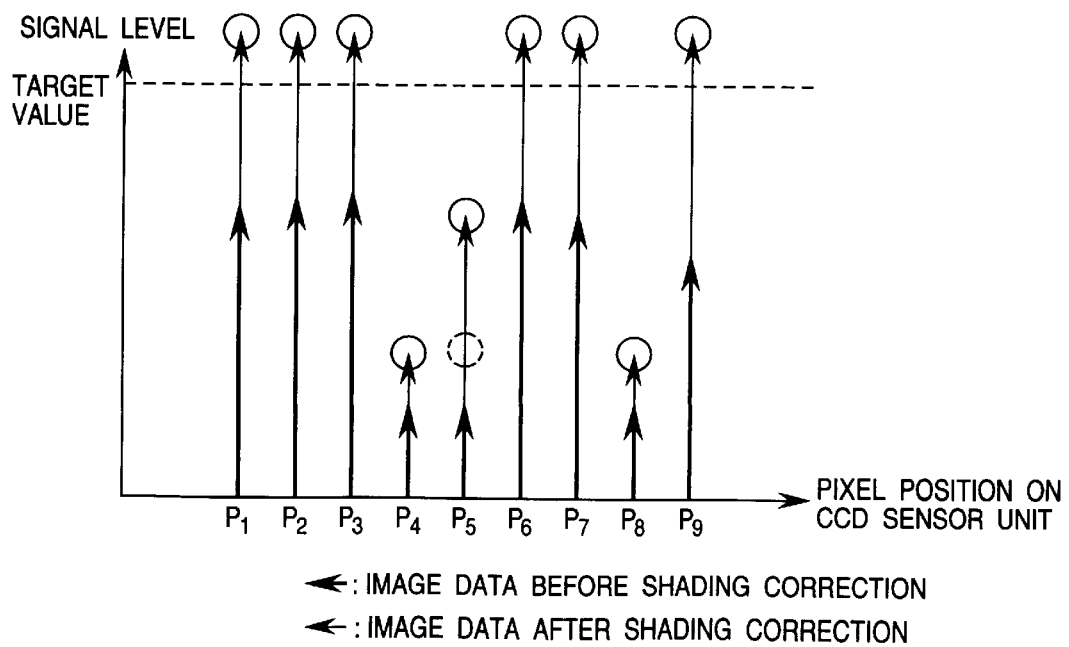
FIG. 12 is a graph for explaining the relationship between the image data obtained by reading an original and the image data shading-corrected using shading data obtained when a fine dust particle is present on the white reference plate.
Figure 13:
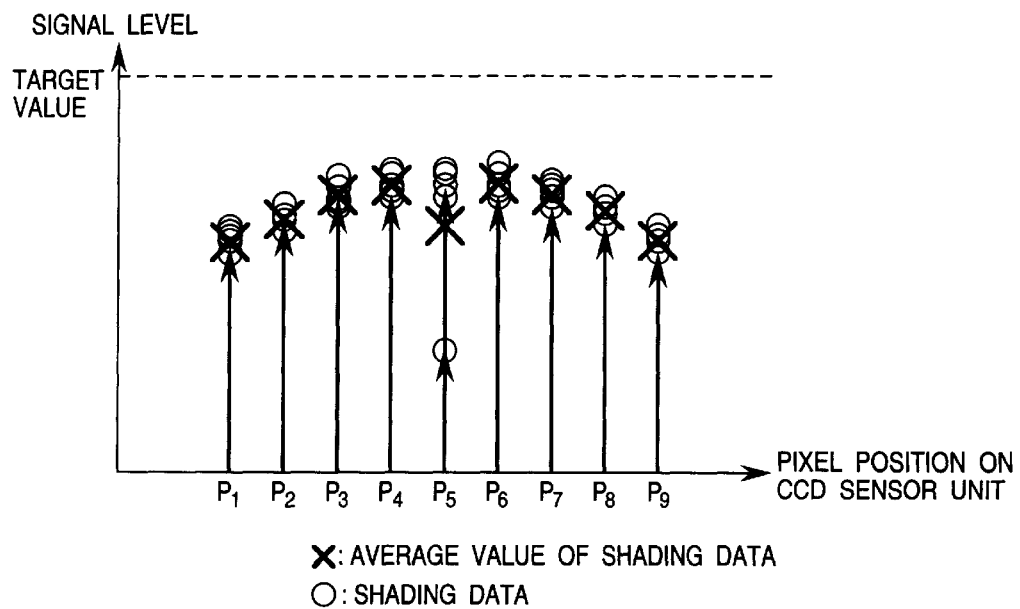
FIG. 13 is a graph for explaining the relationship between the average value of shading data obtained by reading the white reference plate at a plurality of positions and the shading-corrected data value.
Figure 14:
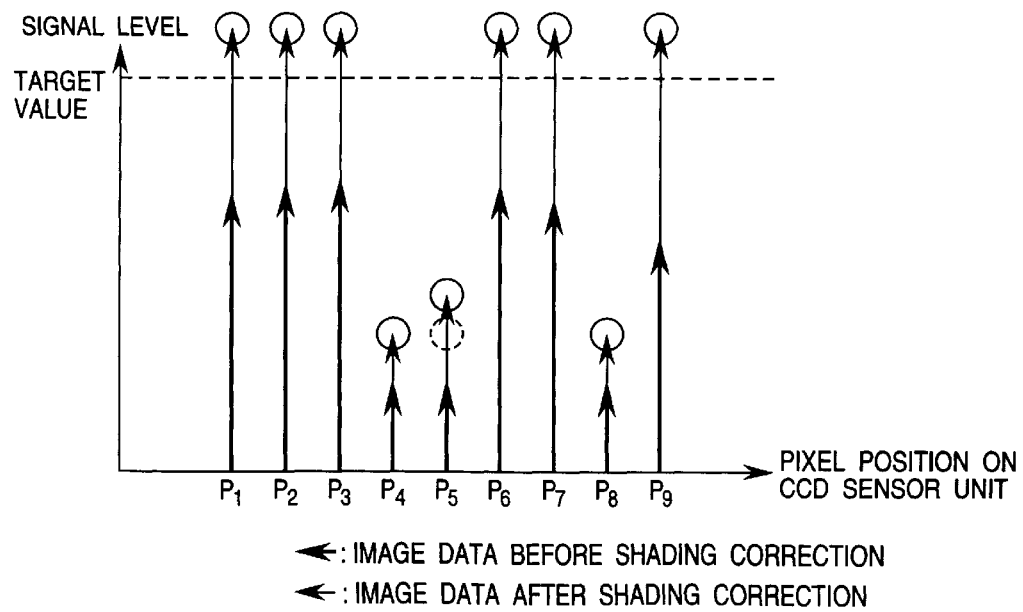
FIG. 14 is a graph for explaining the relationship between image data obtained by reading the original and the image data shading-corrected using shading data obtained by reading the white reference plate at a plurality of positions when a fine dust particle is present on the white reference plate.
Figure 15:
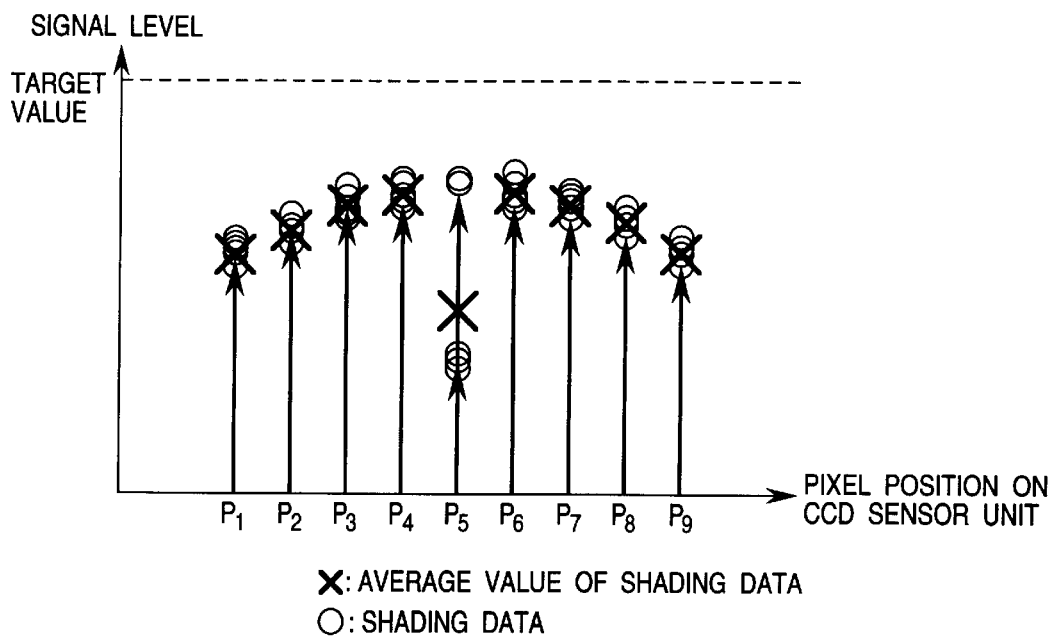
FIG. 15 is a graph for explaining the relationship between the average value of shading data obtained by reading the white reference plate at a plurality of positions and the shading-corrected data value when a large dust particle is present on the white reference plate.
Figure 16:
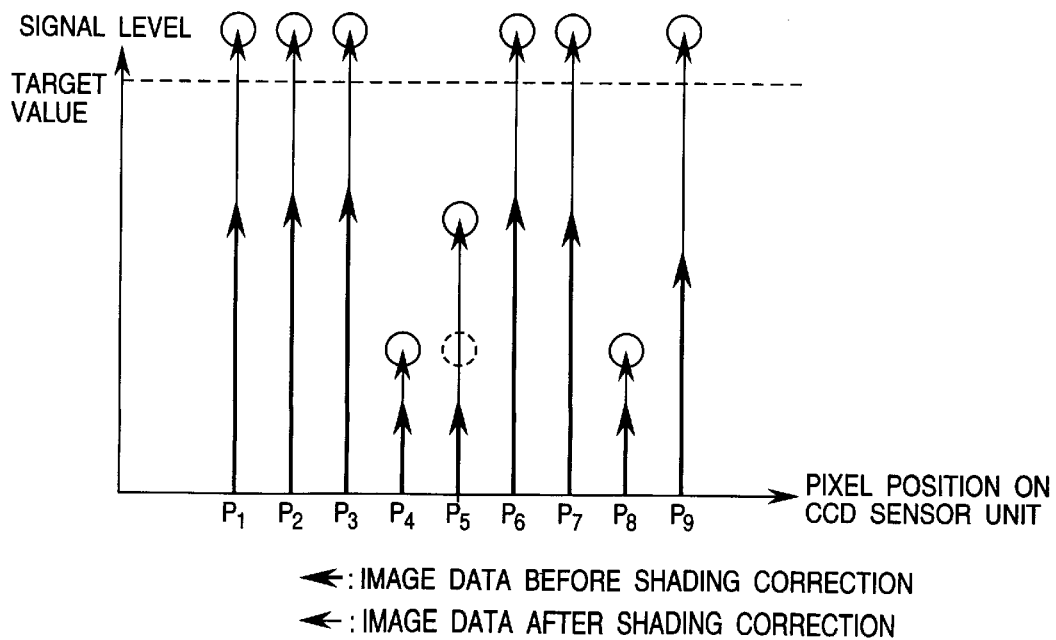
FIG. 16 is a graph for explaining the relationship between image data obtained by reading the original and the image data shading-corrected using shading data obtained by reading the white reference plate at a plurality of positions when a large dust particle is present on the white reference plate.

The shading correction apparatuses described in the first to fourth embodiments can be applied to various image read apparatuses using a CCD, such as the conventional copying machine described with reference to FIG. 8 or a film scanner.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire processes in accordance with designations of the program codes and realizes functions of the above embodiments.

In a case where the present invention is applied to the aforesaid storage medium, the storage medium stores program codes corresponding to the flow charts in FIGS. 2, 4, 6, and 7 described in the first to fourth embodiments.

The present invention is not limited to the above embodiments and various changes and modifications can be made within the spirit and scope of the present invention. Therefore to apprise the public of the scope of the present invention, the following claims are made.

What is claimed is:

1. A shading correction apparatus for performing shading correction of data obtained by reading an original using shading data obtained by reading a white reference plate by an image sensor, said apparatus comprising:
   a first correction data acquisition unit adapted to obtain correction data to be used for shading correction using the shading data obtained by reading the white reference plate in a first direction and a second direction perpendicular to the first direction;
   a second correction data acquisition unit adapted to obtain correction data to be used for shading correction using the shading data obtained by reading the white reference plate in the first direction only; and
   a selection unit adapted to select one of said first correction data acquisition unit and said second correction data acquisition unit so as to reduce the influence by a defect of the white reference plate on the shading correction.

2. The shading correction apparatus according to claim 1, wherein said first correction data acquisition unit obtains the correction data by adding and averaging, in the second direction, the shading data obtained by reading in the first and second directions.

3. The shading correction apparatus according to claim 1, wherein said second correction data acquisition unit controls the image sensor to read the shading data at a designated position within a predetermined region of the white reference plate.

4. The shading correction apparatus according to claim 1, wherein said second correction data acquisition unit selects shading data obtained by reading in the first direction on the basis of a predetermined condition from the shading data obtained by reading the white reference plate in the first and second directions.

5. The shading correction apparatus according to claim 4, wherein said second correction data acquisition unit selects shading data having the largest minimum value among a plurality of shading data obtained by reading in the first direction.

6. The shading correction apparatus according to claim 1, wherein when a minimum value of the shading data obtained by pre-scanning in the first direction exceeds a predetermined value, said selection unit selects said first correction data acquisition unit, and when the minimum value is not more than the predetermined value, said selection unit selects said second correction data acquisition unit.

7. The shading correction apparatus according to claim 1, wherein when a number of times when the minimum value of the shading data obtained by performing pre-scanning in the first direction a plurality of number of times at different positions along the second direction is not more than a predetermined value is not more than a second predetermined value, said selection unit selects said first correction data acquisition unit, and when the number of times exceeds the second predetermined value, said selection unit selects said second correction data acquisition unit.

8. The shading correction apparatus according to claim 1, wherein when a number of times when the minimum value of the shading data obtained by performing pre-scanning in the first direction a plurality of number of times at different positions along the second direction is not more than a predetermined value is consecutively not more than a second predetermined value, said selection unit selects said first correction data acquisition unit, and when the number of times exceeds the second predetermined value consecutively a predetermined number of times, said selection unit selects said second correction data acquisition unit.

9. An image read apparatus for performing shading correction of data obtained by reading an original using shading data obtained by reading a white reference plate by an image sensor, said apparatus comprising:
   a first correction data acquisition unit adapted to obtain correction data to be used for shading correction using the shading data obtained by reading the white reference plate in a first direction and a second direction perpendicular to the first direction;
   a second correction data acquisition unit adapted to obtain correction data to be used for shading correction using the shading data obtained by reading the white reference plate in the first direction only; and
   a selection unit adapted to select one of said first correction data acquisition unit and said second correction data acquisition unit so as to reduce the influence by a defect of the white reference plate on the shading correction.

10. The image read apparatus according to claim 9, wherein said first correction data acquisition unit obtains the correction data by adding and averaging, in the second direction, the shading data obtained by reading in the first and second directions.

11. The image read apparatus according to claim 9, wherein said second correction data acquisition unit controls the image sensor to read the shading data at a designated position within a predetermined region of the white reference plate.

12. The image read apparatus according to claim 9, wherein said second correction data acquisition unit selects shading data obtained by reading in the first direction on the basis of a predetermined condition from the shading data obtained by reading the white reference plate in the first and second directions.

13. The image read apparatus according to claim 12, wherein said second correction data acquisition unit selects shading data having the largest minimum value among a plurality of shading data obtained by reading in the first direction.

14. The image read apparatus according to claim 9, wherein when a minimum value of the shading data obtained by pre-scanning in the first direction exceeds a predetermined value, said selection unit selects said first correction data acquisition means, and when the minimum value is not more than the predetermined value, said selection unit selects said second correction data acquisition unit.

15. The image read apparatus according to claim 9, wherein when a number of times when the minimum value of the shading data obtained by performing pre-scanning in the first direction a plurality of number of times at different positions along the second direction is not more than a predetermined value is not more than a second predetermined value, said selection unit selects said first correction data acquisition unit, and when the number of times exceeds the second predetermined value, said selection unit selects said second correction data acquisition unit.

16. The image read apparatus according to claim 9, wherein when a number of times when the minimum value of the shading data obtained by performing pre-scanning in the first direction a plurality of number of times at different positions along the second direction is not more than a predetermined value is consecutively not more than a second predetermined value, said selection unit selects said first correction data acquisition unit, and when the number of times exceeds the second predetermined value consecutively a predetermined number of times, said selection unit selects said second correction data acquisition unit.

17. A shading correction method of performing shading correction of data obtained by reading an original using shading data obtained by reading a white reference plate by an image sensor, said method comprising:
- a first correction data acquisition step of obtaining correction data to be used for shading correction using the shading data obtained by reading the white reference plate in a first direction and a second direction perpendicular to the first direction;
- a second correction data acquisition step of obtaining correction data to be used for shading correction using the shading data obtained by reading the white reference plate in the first direction only; and
- a selection step of selecting one of the first correction data acquisition step and the second correction data acquisition step so as to reduce the influence by a defect of the white reference plate on the shading correction.

18. The shading correction method according to claim 17, wherein, in the first correction data acquisition step, the correction data is obtained by adding and averaging, in the second direction, the shading data obtained by reading in the first and second directions.

19. The shading correction method according to claim 17, wherein, in the second correction data acquisition step, the image sensor is controlled to read the shading data at a designated position within a predetermined region of the white reference plate.

20. The shading correction method according to claim 17, wherein, in the second correction data acquisition step, shading data obtained by reading in the first direction is selected on the basis of a predetermined condition from the shading data obtained by reading the white reference plate in the first and second directions.

21. The shading correction method according to claim 20, wherein, in the second correction data acquisition step, shading data having the largest minimum value of minimum values is selected among a plurality of shading data obtained by reading in the first direction.

22. The shading correction method according to claim 17, further comprising a pre-scanning step of pre-scanning the white reference plate in the first direction,
wherein, in said selection step, when a minimum value of the shading data obtained by pre-scanning exceeds a predetermined value, the first correction data acquisition step is selected, and when a minimum value is not more than the predetermined value, the second correction data acquisition step is selected.

23. The shading correction method according to claim 17, further comprising a pre-scanning step of pre-scanning the white reference plate in the first direction a plurality of number of times at different positions along the second direct ion,
wherein, in said selection step, when the number of times when a minimum value of the shading data obtained by performing pre-scanning is not more than a predetermined value is not more than a second predetermined value, the first correction data acquisition step is selected, and when a number of times exceeds the second predetermined value, the second correction data acquisition step is selected.

24. The shading correction method according to claim 17, further comprising a pre-scanning step of pre-scanning the white reference plate in the first direction a plurality of number of times at different positions along the second direction,
wherein, in said the selection step, when a number of times when the minimum value of the shading data obtained by pre-scanning is not more than a predetermined value is consecutively not more than a second predetermined value, the first correction data acquisition step is selected, and when a number of times exceeds the second predetermined value consecutively a predetermined number of times, the second correction data acquisition step is selected.

25. A computer readable program of correction method for performing shading correction of data obtained by reading an original using shading data obtained by reading a white reference plate by an image sensor, said program including:
- first computer readable code means for obtaining correction data to be used for shading correction using the shading data obtained by reading the white reference plate in a first direction and a second direction perpendicular to the first direction;
- second computer readable code means for obtaining correction data to be used for shading correction using the shading data obtained by reading the white reference plate in the first direction only; and
- third computer readable code means for selecting one of the first correction data acquisition step and the second correction data acquisition step so as to reduce the influence by a defect of the white reference plate on the shading correction.

26. The computer readable program according to claim 25, wherein said first computer readable code means causes to obtain the correction data by adding and averaging, in the second direction, the shading data obtained by reading in the first and second directions.

27. The computer readable program according to claim 25, wherein said second computer readable code means causes to control the image sensor to read the shading data at a designated position within a predetermined region of the white reference plate.

28. The computer readable program according to claim 25, wherein said second computer readable code means causes to select shading data obtained by reading in the first direction on the basis of a predetermined condition from the shading data obtained by reading the white reference plate in the first and second directions.

29. The computer readable program according to claim 28, wherein said second computer readable code means causes to select shading data having the largest minimum value of minimum values among a plurality of shading data obtained by reading in the first direction.

30. The computer readable program according to claim 25, further comprising fourth computer readable code means for pre-scanning the white reference plate in the first direction,
wherein said third computer readable code means causes to select said first computer readable code means when a minimum value of the shading data obtained by pre-scanning exceeds a predetermined value, and to select said second computer readable code means when a minimum value is not more than the predetermined value.

31. The computer readable program according to claim 25, further comprising fourth computer readable code means for pre-scanning the white reference plate in the first direction a plurality of number of times at different positions along the second direction, wherein said third computer readable code means causes to select said first computer readable code means when the number of times when a minimum value of the shading data obtained by performing pre-scanning is not more than a predetermined value is not more than a second predetermined value, and to select said computer readable code means when a number of times exceeds the second predetermined value.

32. The computer program according to claim 25 further comprising fourth computer readable code means for pre-scanning the white reference plate in the first direction a plurality of number of times at different positions along the second direction, wherein said third computer readable code means causes to select said first computer readable code means when a number of times when the minimum value of the shading data obtained by pre-scanning is not more than a predetermined value is consecutively not more than a second predetermined value, and to causes to select said second computer readable code means when a number of times exceeds the second predetermined value consecutively a predetermined number of times.

* * * * *

UNITED STATES PATENT AND TRADEMARK OFFICE
CERTIFICATE OF CORRECTION

PATENT NO. : 6,704,457 B1 Page 1 of 1
DATED : March 9, 2004
INVENTOR(S) : Takashi Sugiura It is certified that error appears in the above-identified patent and that said Letters Patent is hereby corrected as shown below:

Title page,
Item [56], References Cited, FOREIGN PATENT DOCUMENTS, please delete "GB 23037578" and insert therefore -- GB 2303757 --
OTHER PUBLICATIONS, please delete "JPA9-1492127" and insert therefore -- JPA9-149217 --

Signed and Sealed this

Twenty-seventh Day of July, 2004

JON W. DUDAS
*Acting Director of the United States Patent and Trademark Office*